2,890,192
                 Patented June 9, 1959

2,890,192

HIGH GLOSS PAINT COMPOSITION COMPRISING A MODIFIED AROMATIC HYDROCARBON-ALDEHYDE RESIN, A PIGMENT, AND A TERTIARY AMINE, AND PROCESS OF MAKING SAME

Albert B. Spencer, Albany, N.Y., assignor to General Electric Company, a corporation of New York No Drawing. Application April 4, 1956
Serial No. 575,954

8 Claims. (Cl. 260—43)

This invention relates to the production of high gloss paint compositions. More specifically, this invention involves the discovery that the incorporation of a tertiary amine in a paint composition comprising (1) a paint base selected from the group consisting of (a) copolymers of aromatic-aldehyde resins with ethoxyline resins, (b) copolymers of aromatic-aldehyde resins with methylol phenol ethers, (c) mixtures of the foregoing copolymers and (d) mixtures of methylol phenol ethers with ethoxyline resins, and (2) a pigment, unexpectedly enhances the gloss of the resulting composition.

The foregoing resinous compositions exhibit properties which make them very desirable for use as the resin base in paint compositions, particularly because of their high chemical resistance and physical durability. However, heretofore it has not been possible to achieve the necessary degree of gloss with such resins when sufficient pigment has been incorporated therein to obtain the necessary hiding power. The combination of high gloss and good hiding power becomes particularly important in those applications where it is desirable to achieve both of these results with the use of only one coat, as, for example, in the painting of appliances. "Hiding power," or the power of a coating to obscure a surface to which it is applied, generally necessitates a high pigment content. The combination of good hiding power and high gloss becomes difficult to achieve when it is realized that gloss is an inverse function of pigment content. In general, low pigment content gives highest gloss. As the content of the pigment is increased, the gloss falls off until a constant plateau is reached, at which point the finish is flat.

In accordance with this invention, it has been discovered that the gloss of paint compositions containing certain specific resinous bases can be increased in spite of high pigment content resulting in paint compositions which possess simultaneously high gloss and good hiding power with the application of only a single coat. In addition to the foregoing, the paint compositions of this invention possess increased flow properties. These results are accomplished at low cost and without substantial variation in paint formulation procedure and with substantial savings in methods of application of the coating to the surface.

In general, the objects of this invention are accomplished by incorporating a small amount of a tertiary amine in a paint composition having a specific resin base. The resins which can be used are critical and limited to certain specific resin copolymers or mixtures. In general, the copolymers are the condensation products of aromatic-aldehyde resins and either methylol phenol ether or ethoxyline resins, or mixtures of the foregoing copolymers or of methylol phenol ethers with ethoxyline resins.

The aromatic-aldehyde condensation products useful in this invention are of the type disclosed in copending application Serial No. 414,861 of John M. Witzel, now U.S. Patent 2,825,712, assigned to the assignee of the present application. The resins are the products obtained by the reaction of an aromatic hydrocarbon and an aldehyde, said reaction product having the general formula

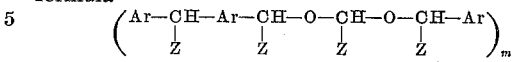

wherein Ar represents aromatic hydrocarbon radicals such as xylyl-naphthyl-, alkylated naphthyl-, anthracyl-, alkylated anthracyl-, mesitylyl-, etc., and Z represents a member selected from the group consisting of hydrogen, alkyl, alkaryl, aralkyl, and heterocyclic oxygen-containing radicals, i.e., furfuryl- where the aldehyde employed is furfural, and $m$ is an integer greater than one, i.e., 1 to 20, with (a) an ether derivative of a methylol phenol having the general formula

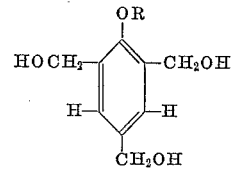

wherein R represents a saturated or an unsaturated aliphatic hydrocarbon radical or (b) with a low molecular weight phenolic resin comprising a mixture of compound (a) and compounds corresponding to the general formula

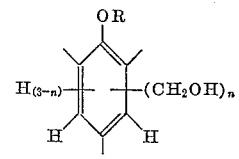

where R has the meaning given above, and $n$ is an integer equal to from 1 to 2, inclusive, or (c) with a complex epoxide resin comprising a polyether derivative of a polyhydric organic compound, e.g., a polyhydric alcohol ether, in which the said polyether derivative contains epoxy groups.

The aromatic hydrocarbon-aldehyde resins included within the scope of this invention may be prepared in the manner hereinafter described. Additionally, they include the classes of aromatic hydrocarbon-aldehyde resins disclosed in German Patent 349,741, and U.S. Patents 2,568,313 and 2,350,230.

Aromatic hydrocarbons which may be reacted with aldehydes to produce the low cost aromatic hydrocarbon-aldehyde resins found eminently suitable in preparing the coating compositions of this invention include ortho-, meta-, and para-xylene individually, commercial xylene which is a mixture of the three xylenes plus a small percentage of ethylbenzene; naphthalene, alkyl-substituted naphthalenes, anthracene and its alkylated derivatives, etc.

Aldehydes which may be used to advantage in preparing the instant aromatic hydrocarbon-aldehyde resins include aldehydes which readily react with phenols to give phenol-aldehyde type resins and include aliphatic aldehydes, for example, formaldehyde, acetaldehyde, propionaldehyde, butyraldehyde, etc., aromatic aldehyde, for example, benzaldehyde, etc.; and heterocyclic oxygen containing aldehydes such as furfural, etc.

The ethoxyline or epoxide resins which are useful in the practice of this invention are generally of the type disclosed in U.S. Patents 2,324,483; 2,444,333; 2,494,295; 2,500,600; 2,511,913 and British Patents 518,057 and 579,698. These resins are, in general, the reaction product of an epoxy containing compound, such as epichlorohydrin, and a polyhydric alcohol or phenol. These resins will hereinafter be referred to as "ethoxyline resins" in the specification and claims.

The methylol phenol ethers are of the type disclosed in U.S. patents to Martin, 2,579,330 and 2,579,331, which patents are assigned to the assignee of the present invention. These ethers are, in general, those disclosed above in connection with the description of the aromatic-aldehyde copolymers and are methylol phenol ethers in which the phenolic hydroxyl group is etherified with a hydrocarbon or halogen hydrocarbon.

The amines which are useful in this invention are either aliphatic or cyclic tertiary amines. Examples of aliphatic tertiary amines which may be used in the practice of this invention are triethyl, tributyl, tripropyl, and triethanol amine. A suitable example of a cyclic amine is pyridine. The preferred amine is, however, triethyl amine. In general, it has been found that the amount of the tertiary amine which must be added to the resinous paint composition is relatively small. A percentage of as little as 0.5 percent, based upon the weight of the resin base solids, will achieve improved results. Beyond a percentage of about 5 percent, additional amine will not substantially improve the gloss of the paint composition. A preferred percentage range lies between about 3 and 5 percent of the tertiary amine. It should be noted that the tertiary amine must be added to the "grinding mill base," which conventionally includes the pigment, a portion of the resinous base and a portion of the solvent. While it has been known to use tertiary amines as anti-livering agents in paint formulations, these anti-livering agents are generally added to the "mix-off," which includes the remainder of the resinous base and solvent, and perform an entirely different function than that performed in this invention. If the tertiary amine is not added to the "grinding mill base" as more fully described hereinafter, the improved results of this invention will not be achieved.

While not limited to the use of any specific pigment, this invention has applicability only where the above referred to resinous materials are admixed with a pigment. The reason for this is that the above-described resinous materials may very well be found to have sufficient gloss without the addition of a tertiary amine. However, as set out above, the addition of a pigment will lower the gloss of the resulting composition. Illustrative examples of pigments which are useful in the practice of this invention are titanium dioxide, cadmium red, carbon black, light chrome green, iron blue, ultramarine blue, furnace black, and others.

In addition to the resin and the pigment, other constituents conventionally added to paint formulations may be present. These additional constituents include solvents, such as xylol, methyl ethyl ketone, methyl Cellosolve, diacetone alcohol, xylene, toluol, methyl isobutyl ketone, butanol, etc. Film-forming resins, such as melamine-formaldehyde and alkyd resins, may also be added. In addition to the foregoing, curing agents, such as phosphoric acid or other mineral acids, may also be used. Inert bulking agents, such as calcium carbonate, magnesuim silicate, and china clay, may likewise be added.

In an illustrative method of carrying out this invention, from 3 to 5% of the tertiary amine is incorporated in the grinding mill base. The ingredients of the grinding mill base are ground in a suitable mill and then incorporated with "mix-off," to produce the paint composition. The resulting composition may, when ready for application, be suitably thinned and applied to the surface to be coated, e.g., as by spraying.

To illustrate the effectiveness of the compositions of this invention, the following examples give formulations with and without the addition of an amine, with the addition of an amine other than a tertiary amine, and with the addition of tertiary amines in accordance with the practice of this invention. The gloss readings of the composition of each example were recorded in a manner hereinafter set out and are summarized in the tables which follow the examples. The examples are given by way of illustration only and not by way of limitation. All parts are by weight. Where percentage figures are indicated for the tertiary amine, these percentages indicate the percent by weight of the amine based upon the weight of resin solids in the resin base.

The ethoxyline resins used in the following examples are known in the trade as "Epon 1007." These resins have a softening point of from 127 to 133° C. and an epoxide equivalent (grams of resin containing one equivalent of epoxide) of 1600 to 1900.

The methylol phenol ethers used are a mixture comprising mixed allyl ethers of polymethylol phenols prepared in accordance with Martin Patent 2,579,330.

The aromatic-aldehyde-ethoxyline copolymers used in the following examples are prepared in accordance with the above referred to U.S. Patent 2,825,712. Specifically, 954 parts of xylene are reacted with 594 parts of paraformaldehyde in the presence of 3000 parts of 50% sulfuric acid at a temperature of 95°–100° C. To 62.5 parts of this product, 125 parts of Epon 1007 are added with 1 part of 85% phosphoric acid and the mixture is agitated at 125–135° C.

The aromatic-aldehyde-methylol phenol ether copolymers used are prepared by reacting 62.5 parts of an 80% solution of the xylene-formaldehyde product prepared as in the above paragraph with 100 parts of a 50% solution of the above described methylol phenol ethers. To this mixture is added one part of 85% phosphoric acid and the mixture is agitated at 125° C.

EXAMPLE 1

The following example illustrates the preparation of a paint using a copolymer of xylene-formaldehyde and ethoxyline as the resin base. No amine was added.

Grinding mill base:

|  | Parts |
| --- | --- |
| Titanium dioxide | 240 |
| Copolymer solution of xylene-formaldehyde and ethoxyline resins containing 60% resin solids | 150 |
| Diacetone alcohol | 45 |
| Xylol | 45 |

Mix-off:

|  | |
| --- | --- |
| Diacetone alcohol | 100 |
| Xylene | 100 |
| Copolymer solution of xylene-formaldehyde and ethoxyline resins containing 60% resin solids | 250 |
| 75% phosphoric acid | 2.4 |
| Resimene 881 [1] | 60 |

[1] Resimene 881 is a butylated melamine-formaldehyde resin.

The ingredients of the grinding mill base were ground in a pebble mill for 24 hours, or until a 7 grind was obtained on the Hegamen grind gauge. The first two ingredients of the mix-off (diacetone alcohol and xylene) were then mixed well and the phosphoric acid added. To this, the 50–50 copolymer resin solution was added and blended. The mill base was then added and, when thoroughly mixed, the Resimene was added. The completed formula was then well shaken.

EXAMPLE 2

The procedure of Example 1 was followed except that 1, 3, 3.5, 5, 6, 7, 8 and 9% respectively of triethylamine (based on the weight of total resin solids in the resin base) was mixed with the grinding mill base of Example 1.

A portion of each of the above eight paints and of the paint prepared in accordance with Example 1 were thinned to a 35 second viscosity with a #2 Zahn cup, using a 50–50 mixture of diacetone alcohol and xylol. These were sprayed on bonderized #1000 steel panels and baked for 12–15 minutes at 200° C. Gloss readings were taken on a Gardner color and color difference meter. The results of these tests were as follows:

Table I

| Percent of triethylamine | 0 | 1 | 3 | 3.5 | 5 | 6 | 7 | 8 | 9 |
|---|---|---|---|---|---|---|---|---|---|
| Gloss Reading | 35 | 75 | 87 | 90 | 91 | 91 | 90 | 90 | 88 |

The above table illustrates the remarkable effectiveness of the addition of a small amount of a tertiary amine in accordance with the practice of this invention. The table also shows that an optimum percentage of the amine lies between 3 and 5%. Below this amount, although improved results are achieved, the optimum gloss is not attained; above this percentage range, little advantage is achieved by the incorporation of additional amine.

EXAMPLE 3

The procedure of Example 2 was followed except that 3.5% of tripropylamine, tributylamine, triethanolamine, methyl glucamine and triethylenetetramine were each substituted for the triethylamine. The resulting paints were thinned and tested as in Example 2 with the following results:

Table II

| Amine | None | Triethyl-amine | Tripropyl-amine | Tributyl-amine | Triethanol-amine | Methyl-glucamine | Tri-ethylene-tetramine |
|---|---|---|---|---|---|---|---|
| Gloss | 35 | 90 | 75 | 76 | 75 | 25 | Mill base gelled [1] |

[1] Gelled in grinding mill, thus no reading possible.

Methyl glucamine is a polyhydroxy secondary amine having one hydrogen, one methyl and one polyhydroxy group attached to a nitrogen atom. Triethylenetetramine is a straight chain hydrocarbon amine having both primary and secondary nitrogens in the chain. The above Table II thus illustrates the ineffectiveness of amines outside the scope of this invention. It further illustrates that best results are achieved with triethylamine, although other tertiary aliphatic amines achieve improved results.

EXAMPLE 4

The following illustrates the preparation of colored paints using as the resin base a mixture of a 50% resin solid solution of ethoxyline resin and a 100% resin solid solution of methylol phenol ether. No amines were added.

| Grinding Mill Base | A | B | C | D | E |
|---|---|---|---|---|---|
| | Parts | Parts | Parts | Parts | Parts |
| Ethoxyline Resin | 150 | 250 | 250 | 250 | 250 |
| Diacetone Alcohol | 50 | | | | |
| Xylol | 50 | | | | |
| Titanium Dioxide | 258 | | | | |
| Cadmium Red | 12 | | | | |
| Carbon Black | | | | 240 | |
| Light Chrome Green | | 20 | | | |
| Iron Blue | | | 68 | | |
| Calcium Carbonate | | | 6 | | 43 |
| Ultramarine Blue | | | 40 | | 40 |
| Methyl Ethyl Ketone | | 80 | 80 | 80 | 13 |
| Methyl Cellosolve | | 25 | 25 | 25 | 80 |
| Mix-Off: | | | | | 25 |
| Diacetone Alcohol | 47 | 50 | 50 | 50 | 50 |
| Xylene | 70 | | | | |
| Toluol | 8 | | | | |
| Methyl-isobutyl Ketone | 28 | | | | |
| 75% Phosphoric Acid | 3 | 2.5 | 2.5 | 2.5 | 2.5 |
| Methylol Phenol Ether | 186 | 186 | 186 | 186 | 186 |
| Ethoxyline Resin | 295 | 195 | 195 | 195 | 195 |
| Resimene 881 | 75 | 75 | 75 | 75 | 75 |
| Methyl Cellosolve | | 75 | 75 | 75 | 75 |

The mixing procedure for the above examples was similar to that of Example 1, i.e., first the solvents were blended, then the phosphoric acid was added, then the resin mixture was added and mixed well. The mill base was then added and mixed well, and finally the Resimene was added.

EXAMPLE 5

The same formulation and procedure was used except that 3.5% of triethylamine was added to the mill bases of Example 4. The resulting paints, as well as those of Example 4, were thinned and tested as in Example 2. In the following table the results of these tests are tabulated. $A^1$, $B^1$, $C^1$, $D^1$, $E^1$ designate the compositions of Example 5 with triethylamine, which correspond to the same compositions of Example 4, without an amine.

Table III

| Composition | A | A' | B | B' | C | C' | D | D' | E | E' |
|---|---|---|---|---|---|---|---|---|---|---|
| Gloss Reading | 3 | 88 | 75 | 99 | 35 | 99 | 2 | 90 | 30 | 90 |

The above table illustrates that this invention is as effective with colored as with uncolored paint compositions.

EXAMPLE 6

This example illustrates the preparation of a paint containing as the resin base a 75% resin solids solution of a copolymer of methylol phenol ether and xyleneformaldehyde.

Grinding mill base: Parts
Copolymer resin solution of methylol phenol ether and xylene-formaldehyde _____ 100
Diacetone alcohol _____ 50
Xylol _____ 50
Titanium dioxide _____ 300
Butanol _____ 9
Mix-off:
Diacetone alcohol _____ 50
Xylol _____ 50
75% phosphoric acid _____ 3
Copolymer resin solution of methyl phenol ether and xylene-formaldehyde _____ 167
50% solids content solution of a castor oil modified glycerine-phthalic anhydride condensation product _____ 200
Resimene 881 _____ 40

The first two ingredients of the mix-off were mixed and the phosphoric acid added. These were then well mixed. To this, the copolymer resin solution was added and blended. Then the mill base was added and when mixed thoroughly, the alkyd resin and Resimene were added. The complete formula was then shaken well.

EXAMPLE 7

The same formulation as that used in Example 6 was prepared except that 3.5% triethylamine was added to the grinding mill base. This paint as well as that of Example 6 were thinned, sprayed, baked and gloss readings taken as in the above examples. The results are shown in the following table:

Table IV

| Composition | Example 6 (without amine) | Example 7 (with amine) |
|---|---|---|
| Gloss Reading | 4 | 98 |

EXAMPLE 8

This example illustrates the effectiveness of a tertiary cyclic amine. A paint composition was formulated using as the resin base a mixture of a 50% resin solid solution of ethoxyline resin and a 100% resin solid solution of methylol phenol ether. The composition was as follows:

Grinding mill base: Parts
- Ethoxyline resin _____ 150
- Diacetone alcohol _____ 50
- Xylol _____ 50
- Titanium dioxide _____ 258
- Cadmium red _____ 12
- Pyridine _____ 14 (3.5%)

Mix-off:
- Diacetone alcohol _____ 47
- Xylene _____ 70
- Toluol _____ 8
- Methyl-isobutyl ketone _____ 28
- 75% phosphoric acid _____ 3
- Methylol phenol ether _____ 186
- Ethoxyline resin _____ 295
- Resimene 881 _____ 75

The mixing procedure was identical with that of Example 4. The above formulation was tested in the same manner as the preceding examples with and without the addition of the tertiary cyclic amine. The results were as follows:

Table V

| Composition | No Amine | Pyridine |
|---|---|---|
| Gloss Reading | 3 | 82 |

The above table illustrates that tertiary cyclic amines are also effective for enhancing gloss.

From the above, it can be seen that an effective method has been discovered for producing a paint composition having an unexpectedly high gloss in combination with high pigment content. This has been achieved in a very simple and economical manner by the addition of a small amount of a readily available chemical constituent. This invention is useful in paint formulations wherever the above resins or resin combinations are used as the paint base and wherever enhanced gloss is desired. It has particular utility where one coat applications are ordinarily used, and where a combination of high chemical resistance, high gloss and good hiding power must be achieved in that single coat, as in the coating of appliances. The addition of the amine achieves the improved results without an adverse effect upon the stability of the paint composition. It has been found that the viscosity increase of formulations of this invention after prolonged exposure to air is fully comparable with similar compositions of the prior art.

What I claim as new and desire to secure by Letters Patent of the United States is:

1. A paint composition comprising (1) a paint base selected from the group consisting of (a) copolymers of aromatic hydrocarbon-aldehyde resins, said aromatic hydrocarbon having an alkyl substituent, with complex epoxide resins obtained by reacting a member selected from the group consisting of polyhydric alcohols and polyhydric phenols with an epihalohydrin, said epoxide resin having more than one epoxy group per molecule, (b) copolymers of said aromatic hydrocarbon-aldehyde resins with methylol phenol ethers, said methylol phenol ethers being a composition selected from the group consisting of (i) a composition having the general formula

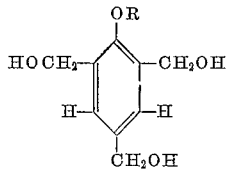

wherein R is a radical selected from the group consisting of saturated and ethylenically unsaturated aliphatic hydrocarbon radicals, and (ii) a composition comprising (i) and a composition corresponding to the general formula

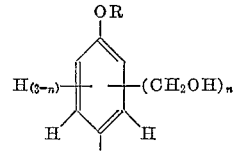

wherein R has the meaning given above and n is an integer equal from 1 to 2, inclusive, (c) mixtures of the foregoing copolymers and (d) mixtures of said methylol phenol ethers with said epoxide resins, (2) a pigment, and (3) up to 5% by weight of the resin base solids of an amine selected from the group consisting of triethyl, tributyl, tripropyl, and triethanol amine and pyridine.

2. The paint composition of claim 1 in which the paint base is a copolymer of said methylol phenol ethers and said aromatic hydrocarbon-aldehyde resins.

3. The paint composition of claim 1 in which the paint base is a copolymer of said aromatic hydrocarbon-aldehyde resins and said epoxide resins.

4. The paint composition of claim 1 in which the paint base is a mixture of said methylol phenol ethers and said epoxide resins.

5. The paint composition of claim 1 in which the amine is triethylamine.

6. The paint composition of claim 1 in which the amine is present in amounts from about 3–5%, by weight, of the resin base solids.

7. A process for producing a high gloss paint composition which comprises incorporating up to 5%, by weight, of resin base solids, of an amine selected from the group consisting of triethyl, tributyl, tripropyl, and triethanol amine and pyridine, in the grinding mill base of a paint composition comprising (1) a paint base selected from the group consisting of (a) copolymers of aromatic hydrocarbon-aldehyde resins, said aromatic hydrocarbon having an alkyl substituent, with complex epoxide resins obtained by reacting a member selected from the group consisting of polyhydric alcohols and polyhydric phenols with an epihalohydrin, said epoxide resin having more than one epoxy group per molecule, (b) copolymers of said aromatic hydrocarbon-aldehyde resins with methylol phenol ethers, said methylol phenol ethers being a composition selected from the group consisting of (i) a composition having the general formula

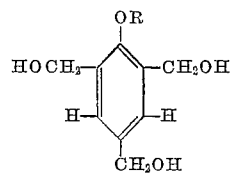

wherein R is a radical selected from the group consisting of saturated and ethylenically unsaturated aliphatic hydrocarbon radicals, and (ii) a composition comprising (i) and a composition corresponding to the general formula

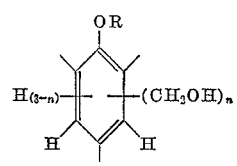

wherein R has the meaning given above and n is an integer equal to from 1 to 2, inclusive, (c) mixtures of the foregoing copolymers and (d) mixtures of said methylol phenol ethers with said epoxide resins, and (2) a pigment, and adding a mix-off to said grinding mill base having incorporated therein said amine, said mix-off comprising additional grinding mill base and a solvent for the paint composition.

8. The process of claim 7 in which the amine is triethylamine added in percentages of from about 3–5%, by weight, of the resin base solids.

References Cited in the file of this patent

UNITED STATES PATENTS 2,521,911     Greenlee _____ Sept. 12, 1950
2,579,329     Martin _____ Dec. 18, 1951

OTHER REFERENCES

"Marmion," Research (London), volume 7, 1954, pages 351–355.